US012776150B2

(12) United States Patent
Heath et al.

(10) Patent No.: US 12,776,150 B2
(45) Date of Patent: Oct. 27, 2026

(54) FORGOTTEN ITEM IN VEHICLE DETECTION USING DEPTH AIDED IMAGE BACKGROUND REMOVAL

(71) Applicant: Nissan North America, Inc., Franklin, TN (US)

(72) Inventors: Corey Heath, Scottsdale, AZ (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 299 days.

(21) Appl. No.: 18/496,123

(22) Filed: Oct. 27, 2023

(65) Prior Publication Data

US 2025/0139992 A1 May 1, 2025

(51) Int. Cl.
*G06V 20/59* (2022.01)
*G06V 10/34* (2022.01)
*B60W 60/00* (2020.01)

(52) U.S. Cl.
CPC .............. *G06V 20/59* (2022.01); *G06V 10/34* (2022.01); *B60W 60/00253* (2020.02)

(58) Field of Classification Search
None
See application file for complete search history.

(56) References Cited

U.S. PATENT DOCUMENTS

| | | | | |
|---|---|---|---|---|
| 10,140,533 | B1 * | 11/2018 | Chan | B60W 60/0059 |
| 10,710,608 | B2 * | 7/2020 | Hershkovitz | B60W 50/0097 |
| 10,850,693 | B1 * | 12/2020 | Pertsel | G06V 40/103 |
| 10,956,759 | B1 * | 3/2021 | Pertsel | G06V 40/103 |
| 10,967,824 | B1 * | 4/2021 | Pertsel | B60R 21/01544 |
| 11,040,619 | B1 * | 6/2021 | Martin | B60Q 9/00 |
| 11,498,500 | B1 * | 11/2022 | Pertsel | G06V 40/103 |
| 11,518,377 | B2 * | 12/2022 | Lu | B60W 30/09 |
| 11,654,770 | B1 * | 5/2023 | Martin | G06V 20/59 701/36 |
| 11,702,011 | B1 * | 7/2023 | Suggu | G06V 10/774 348/148 |
| 11,702,066 | B2 * | 7/2023 | Golston | B60W 40/08 701/23 |
| 11,713,600 | B1 * | 8/2023 | Weng | E05B 77/26 382/103 |
| 2018/0326999 | A1 * | 11/2018 | Hershkovitz | G06V 40/20 |
| 2019/0197325 | A1 * | 6/2019 | Reiley | G06V 20/59 |

* cited by examiner

*Primary Examiner* — Anand P Bhatnagar
(74) *Attorney, Agent, or Firm* — Young Basile Hanlon & MacFarlane, P.C.

(57) ABSTRACT

Vehicle forgotten item detection using depth aided image background removal includes determining a first image of an interior of a vehicle for a start of a time-period and a second image for the interior of the vehicle for an end of the time-period. The first image and the second image include a depth metric. One or more elements present in both the first image and the second image are removed from the second image. One or more remaining elements are determined to exist within the second image after removal, which are categorized. An occupant of the vehicle is selectively notified based on the categorization.

20 Claims, 6 Drawing Sheets

FORGOTTEN ITEM IN VEHICLE DETECTION USING DEPTH AIDED IMAGE BACKGROUND REMOVAL

TECHNICAL FIELD

This application relates to forgotten item detection in vehicles, specifically depth aided image background removal for detecting forgotten item within vehicles.

BACKGROUND

Items unintentionally left within a vehicle can range from a mild annoyance to a life-threatening emergency. Additionally, with an increase in autonomous vehicle usage for taxis and ride-shares and the operation of autonomous vehicles without extensive human monitoring within the cabin of the vehicle, these issues will become more prevalent.

SUMMARY

Disclosed herein are aspects, features, elements, and implementations for analyzing a vehicle interior for forgotten items and properly notifying an individual for retrieval.

A first aspect is a method that includes determining a first image of an interior of a vehicle for a start of a time-period and a second image for the interior of the vehicle for an end of the time-period, wherein the first image and the second image include a depth metric, removing from the second image, one or more elements present in both the first image and the second image, determining that there are one or more remaining elements included in the second image, categorizing the one or more remaining elements of the second image, and selectively, based on a categorization of at least one of the one or more remaining elements, notifying an occupant of the vehicle.

A second aspect is an apparatus. The apparatus includes a processor that is configured to determine a first image of an interior of a vehicle for a start of a time-period and a second image for the interior of the vehicle for an end of the time-period, wherein the first image and the second image include a depth metric, remove from the second image, one or more elements present in both the first image and the second image, determine that there are one or more remaining elements included in the second image, categorize the one or more remaining elements of the second image, and selectively, based on a categorization of at least one of the one or more remaining elements, notify an occupant of the vehicle.

A third aspect is a non-transitory computer-readable medium storing instructions operable to cause one or more processors to perform operations that include determining a first image of an interior of a vehicle for a start of a time-period and a second image for the interior of the vehicle for an end of the time-period, wherein the first image and the second image include a depth metric, removing from the second image, one or more elements present in both the first image and the second image, determining that there are one or more remaining elements included in the second image, categorizing the one or more remaining elements of the second image, and selectively, based on a categorization of at least one of the one or more remaining elements, notifying an occupant of the vehicle.

These and other aspects of the present disclosure are disclosed in the following detailed description of the embodiments, the appended claims, and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

DETAILED DESCRIPTION

Figure 1:
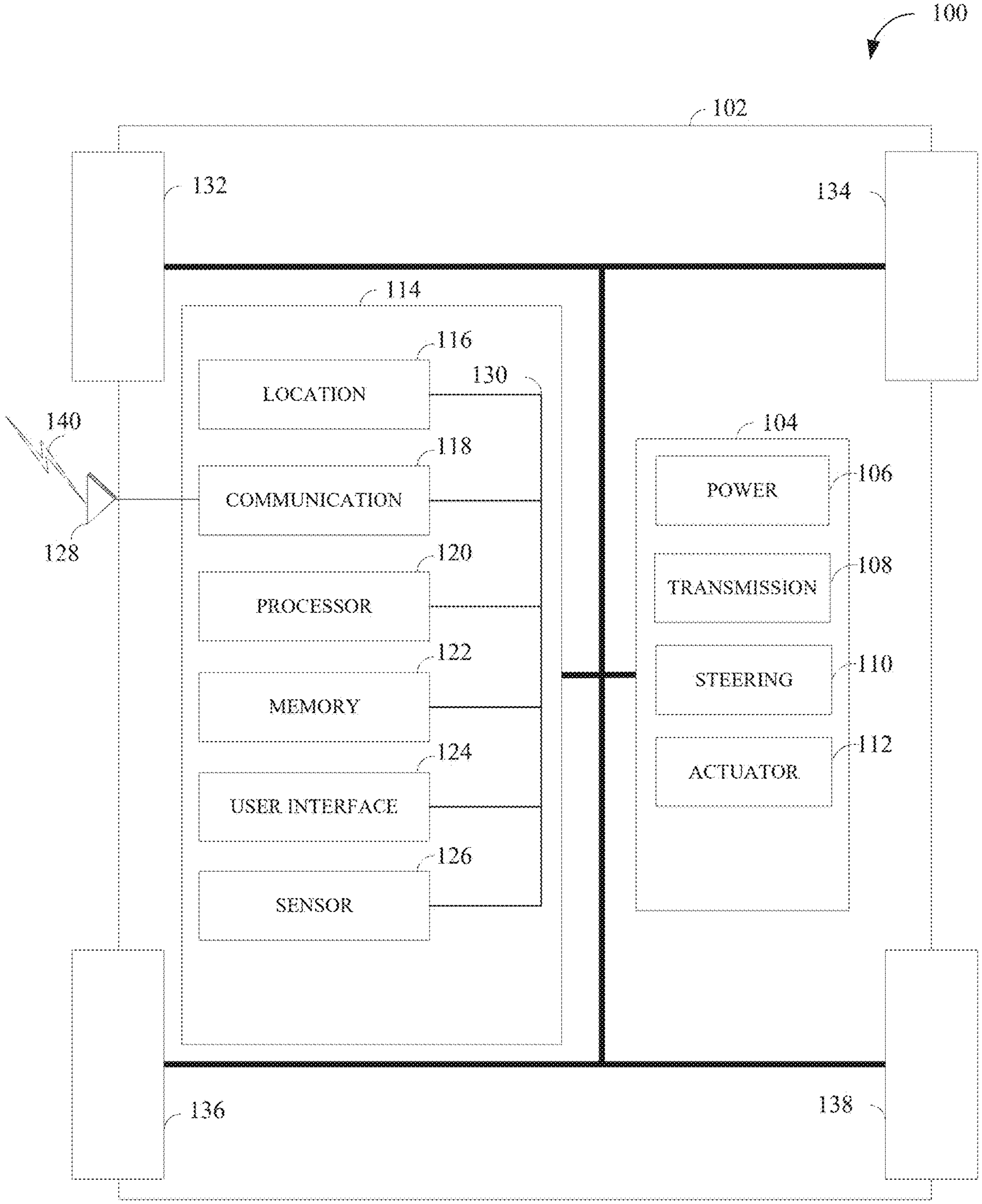
FIG. 1 is a diagram of an example of a portion of a vehicle in which the aspects, features, and elements disclosed herein may be implemented.

A vehicle may traverse a portion of a vehicle transportation network. The vehicle transportation network can include one or more unnavigable areas, such as a building; one or more partially navigable areas, such as a parking area (e.g., a parking lot, a parking space, etc.); one or more navigable areas, such as roads (which include lanes, medians, intersections, etc.); or a combination thereof.

The vehicle may include one or more sensors. Traversing the vehicle transportation network may include the sensors generating or capturing sensor data, such as data corresponding to an operational environment of the vehicle, or a portion thereof. For example, the sensors may include a camera, as such the sensor data may be an image or a stream of images. The image or stream of images may be of the cabin of the vehicle. At the start of a trip the camera may capture an image or stream of images of the cabin of the vehicle. Such an image may also be referred to as a reference image herein. A reference image may be compared to an image or stream of images captured at a future time to detect items unintentionally left in the vehicle.

Items unintentionally left in the vehicle (i.e., forgotten items) can cause anything from a minor annoyance or inconvenience to a life-threatening emergency. Children, elderly people, disabled people, and pets are at risk of dangerous exposure from being unintentionally left in a vehicle.

Forgotten items in taxis and ride-shares are also problematic. A purse, mobile phone, wallet, etc. left in a ride share may go unnoticed by the driver. This can cause an inconvenience to the passenger when attempting to retrieve their forgotten items. Furthermore, people may intentionally leave their belongings in the vehicle for nefarious reasons. These situations will only become more prevalent once more taxi and ride-share vehicles operate autonomously (i.e., without extensive human monitoring).

An efficient method of detecting forgotten items within the cabin of vehicle and quickly notifying the occupant is desirable to decrease the negative side effects. For example, passenger of a taxi or ride-share may spend a significant amount of time trying to locate a lost purse or wallet after forgetting the item in the taxi or ride-share. Even when the passenger realizes that the items were forgotten within the vehicle, it could take significant effort to track down and locate the exact vehicle in which the item was forgotten. However, if the passenger or even the driver was notified within minutes of the items being forgotten, the time to recover lost items could decrease significantly.

Additionally, children, disabled or elderly people, or pets may be left intentionally or unintentionally within the cabin of a vehicle. A system that can detect an unattended person or animal within an unoccupied vehicle and notify an emergency service of the situation in a timely fashion could reduce the risk to that person or animal.

To describe some implementations of the forgotten item detection and notification according to the teachings herein in greater detail, reference is first made to the environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals; power, such as electrical power or torque; or both information and power may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices. The processor 120 may also implement some or all of the proactive risk mitigation described herein.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 118 and a single one of the electronic communication interface 128, any number of communication units and any number of communication interfaces may be used. In some embodiments, the electronic communication unit 118 can include a dedicated short-range communications (DSRC) unit, a wireless safety unit (WSU), IEEE 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

The vehicle, such as the vehicle 100, may be an autonomous vehicle or a semi-autonomous vehicle. For example, as used herein, an autonomous vehicle as used herein should be understood to encompass a vehicle that includes an advanced driver assist system (ADAS). An ADAS can automate, adapt, and/or enhance vehicle systems for safety and better driving such as by circumventing or otherwise correcting driver errors.

Figure 2:
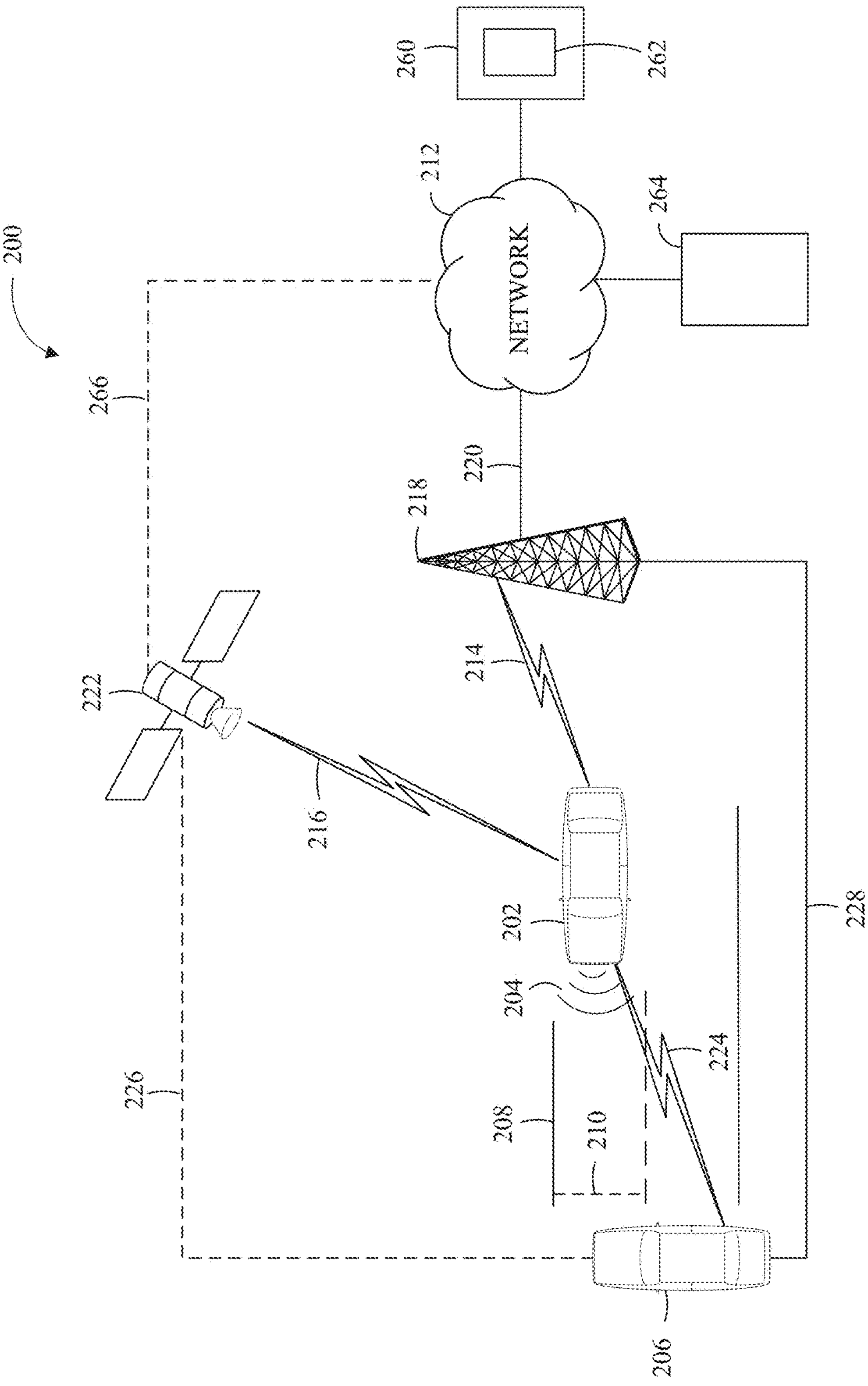
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208, and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some implementations, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206)

may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

Figure 3:
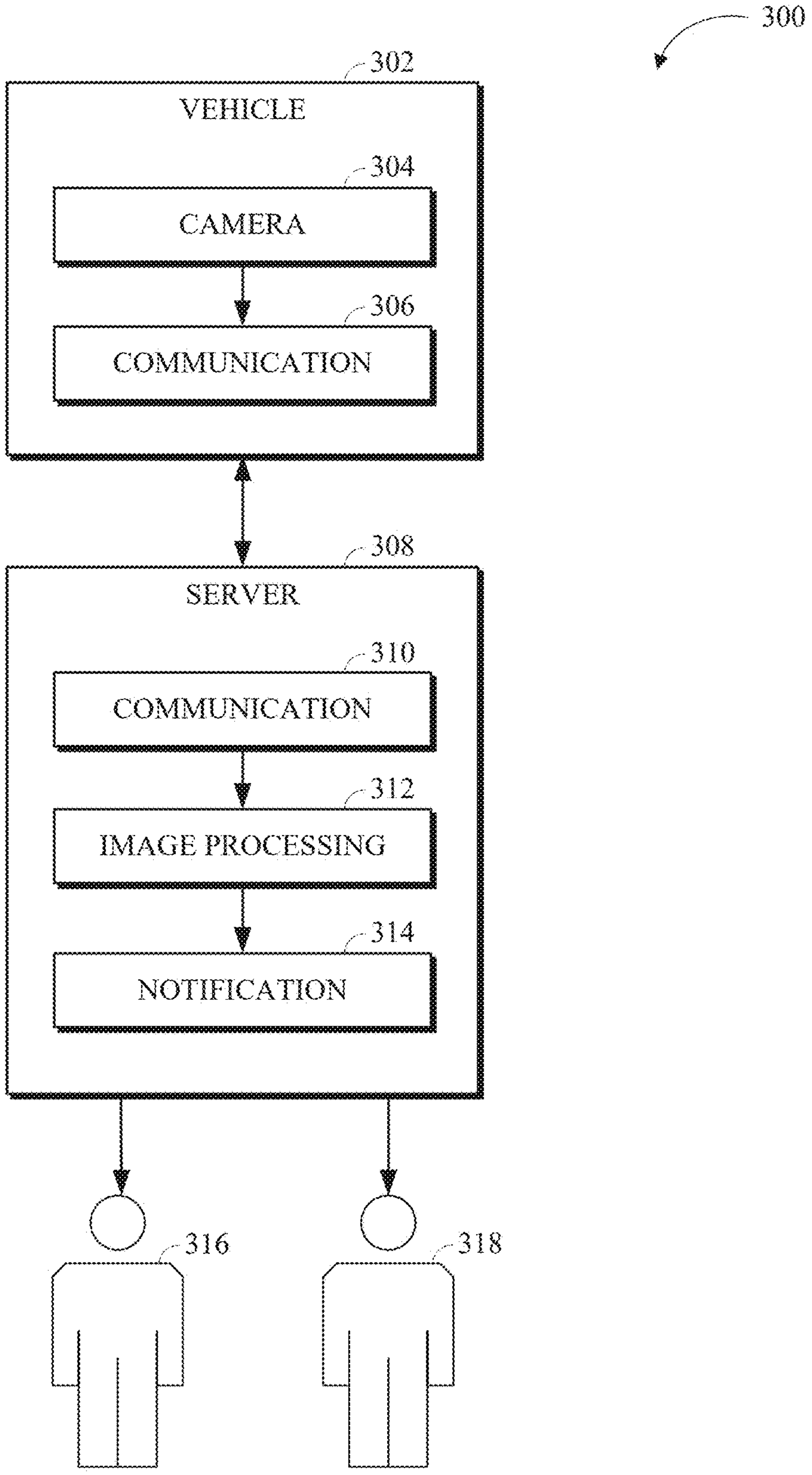
FIG. 3 is an overview of a system for generating notifications for forgotten items.

FIG. 3 is an overview of a system for generating notifications for forgotten items. Although described with a vehicle traveling through a vehicle transportation network, such as the vehicle transportation network 208, the teachings herein may be used in any area navigable by a vehicle, which areas are collectively referred to as a vehicle transportation network. The system 300 includes a vehicle 302, and a server 308 that interact with an occupant (or previous occupant) 316 and/or an external entity 318. Other examples of the system 300 can include more, fewer, or other components.

The vehicle 302 may be the same as or similar to the vehicle 100 or the vehicle 202 of FIG. 2. The vehicle 302 includes a camera 304 and a communication module 306. The camera 304 can be an example of a sensor 126 as described above. The camera 304 maybe one or more cameras, an infrared camera, a stereo camera or any combination thereof. The camera 304 may be mounted within (e.g., interior to) the cabin of the vehicle 302. The camera 304 may be used to capture an image or a stream of images (i.e., aggregate of multiple images) of the cabin of the vehicle 302. In some embodiments the camera 304 may have an ambient light attached to it.

The communication module 306 can be the same as the communication module 118.

The server 308 may include a communication module 310, an image processing module 312, and a notification module 314. In some examples, the components can be combined; in other examples, a component can be divided into more than one component. For example, the server 308 may be implemented in vehicle, in which case separate communication modules 306, 310 may be omitted such that communications/signals described herein travel along the communication bus 130. The image processing module 312 of the server 308 may correspond to a processor and optionally memory, such as the processor 120 and the memory 122 of FIG. 1. The notification module 314 may be implemented using a user interface, such as the user interface 124.

The server 308 is not required to be implemented in a vehicle. Instead, the server 308 may be implemented in a remote support control system, such as a remote support control system operated at the server computing device 234.

The communication module 306 and the communication module 310 may be used to facilitate communication between the vehicle 302 and the server 308. The communication module 306 and the communication module 310 may send, receive, or both send and receive data to and from the server 308. The data may include but is not limited to images or streams of images captured by the camera 304.

The image processing module 312 may be used to process images received by the server 308 (e.g., via the communication module 310). The image processing module 312 may receive a first image or stream of images from the vehicle 302 corresponding to a beginning of a time-period. Such an image or stream of images might also be referred to as a reference image. The image processing module 312 may also receive a second image or stream of images from the vehicle 302 corresponding to an end of a time-period. Such an image or stream of images might also be referred to as a comparison image.

The image processing module 312 may be used to compare the reference image to the comparison image. The reference image and the comparison image may be an image including red, green, blue, and depth (RGB-D) data (e.g., metrics). The image processing module 312 may use background subtraction to compare the reference image and the comparison image. For example, the image processing module 312 may subtract the reference image from the comparison image. More specifically, the reference image may be an image of the cabin of a vehicle, such as the vehicle 302 from a time when the cabin was empty of any extraneous items (i.e., items not fixed within the cabin of the vehicle). The comparison image may be an image of the cabin of the vehicle after a time-period in which the vehicle was driven to a destination. Both the reference and comparison image may be taken from the same perspective. After the reference image is subtracted from the comparison image there may still be remaining elements (i.e., items, objects, people, pets, etc.) within the comparison image. The image processing module may then use an object detection algorithm to identify the remaining elements within the comparison image.

Additionally, each of the reference image and the comparison image may be an infrared image. The image processing module 312 may use background subtraction to compare the reference image and the comparison image. However, in addition to using an object detection algorithm to identify or determine what the remaining elements within the comparison image are, the image processing module 312 may also analyze infrared signatures present in the infrared image. Using the infrared data, the image processing module 312 may detect active and residual infrared signatures. The residual infrared signatures may be filtered and associated with occupants of the cabin of the vehicle that are no longer present, whereas active infrared signatures may be used to detect an occupant still within the cabin of the vehicle. For example, after performing the image subtraction on the comparison image using the reference image, the image processing module 312 may determine that a baby carrier remains within the vehicle. However, a baby carrier left within the cabin of the vehicle is not always a forgotten item. Using the infrared data from the image, the image processing module 312 may determine there is an active infrared signature within the baby carrier. In this case the infrared signature may be used to detect the presence of a baby that has been left within the vehicle unintentionally as compared to an empty baby carrier. This contrasts with using an RGB-D image alone, which does not achieve the same result.

The notification module 314 may be used to send a notification to a current and/or previous occupant 316 of the vehicle (e.g., driver, passenger), to the external entity 318 (e.g., an emergency service or other road service), or any combination thereof. The notification to be sent may be a notification about a minor issue such as a forgotten item belonging to the driver or something more serious such as a notification to an emergency service that a baby has been left within an unoccupied vehicle. The notification module 314 may send the notification via short message service (SMS), multimedia message service (MMS), electronic mail (e-mail), rich communication services (RCS), push notification, or the like.

Figure 4:
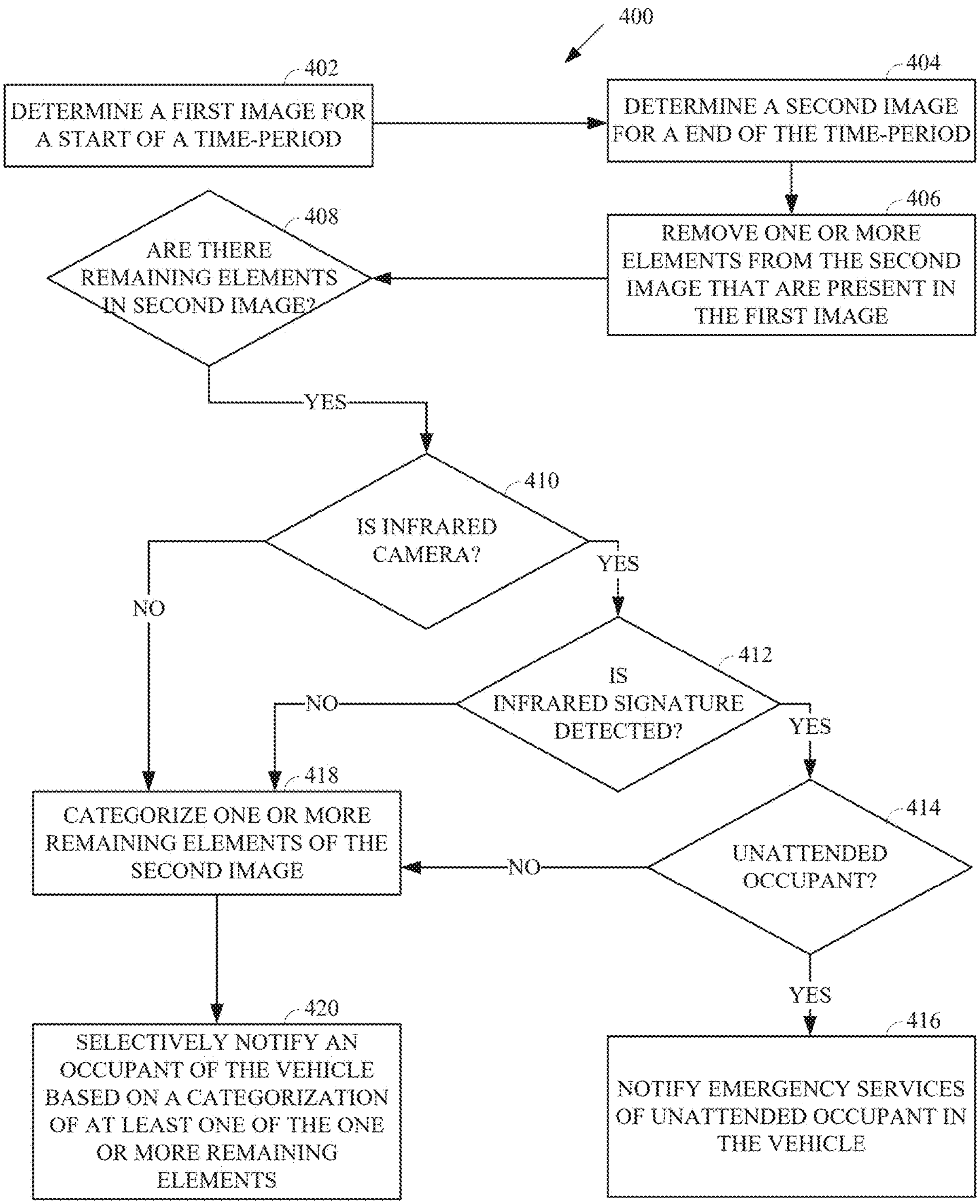
FIG. 4 is a flowchart of an example of a process for object detection using depth aided and infrared aided background removal to generate notifications.

FIG. 4 is a flowchart of an example of a process 400 for object detection using depth aided and, optionally, infrared aided background removal to generate notifications. The process 400 includes operations 402 through 420, which are described below. The process 400 can be implemented in whole or in part by the system 300 of FIG. 3, in particular by the vehicle 302. The process 400 can be stored in a memory (such as the memory 122 of FIG. 1) as instructions that can be executed by a processor (such as the processor 120 of FIG. 1) of a vehicle (such as the vehicle 100 of FIG. 1). The process 400 may be implemented in whole or in part by a remote support control system, such as at the server computing device 234.

The process 400 receives inputs, where the inputs may include sensor data (i.e., sensor observations), such as the measurement from one or more sensors 126. The sensor data can be used to detect the beginning of a time-period (i.e., beginning of a trip) or the end of a time-period (i.e., end of a tip). That is, for example, the sensor data can be used to determine when the vehicle begins a trip and when the vehicle ends the trip. The sensor data may be able to determine that an occupant has entered the vehicle, started the vehicle, piloted the vehicle, arrived at a destination, and/or exited the vehicle, defining a start and/or an end of a trip.

In an example, the sensors may be able to detect a door of the vehicle opening and that the vehicle has been started. This may imply that an occupant has entered the vehicle and may signal the start of a trip. Furthermore, the sensors may be able to determine that the vehicle has moved from one location to another (i.e., been piloted, been driven), has been turned off, and a door of the vehicle has closed. This may signal the end of the trip.

In some embodiments the end of the trip may be determined using a motion detection sensor, such as a motion detection sensor mounted within the cabin of the vehicle. For example, the sensors within the vehicle may detect the start of a trip; however, none of the other indicators to determine the end of a trip may be detected. The motion sensor may not detect any movement within the cabin of the vehicle after a predefined amount of time and the lack if movement may signal the end of a trip.

In a further example, the start and end of the trip may be determined using a navigation system within the vehicle. As such, when the occupant of the vehicle starts the navigation system of the vehicle, the start of the trip may be defined, and a corresponding reference image (also called a first image) may be captured. Additionally, when the vehicle reaches the desired location, the end of the trip may be defined, and a corresponding comparison image (also called a second image) may be captured.

More specifically, at operation 402, the process 400 determines a first image (i.e., the reference image) for a start of a time-period (e.g., a trip). That is, the process 400 may receive sensor data that may imply the start of the trip. The reference image may be captured using one or more cameras mounted within the cabin of the vehicle, such as the camera 304 of FIG. 3.

At operation 404, the process 400 determines a second image (i.e., the comparison image) for an end of the time-period (e.g., a trip). That is, the process 400 may receive sensor data that implies the end of the trip. The comparison image may be captured using one or more cameras mounted within the cabin of the vehicle, such as the camera 304 of FIG. 3.

At operation 406, one or more elements that are present in the first image are removed from the second image. In other words, the elements common to both the reference image and the comparison image are removed from the comparison image. The common elements may be removed using depth aided image background removal (i.e., background subtraction). For example, the reference image may be an RGB-D image of the cabin of the vehicle captured when the trip started. The comparison image may be an RGB-D image of the cabin of the vehicle captured when the trip ends. The reference image may include the empty cabin of the vehicle while the comparison image may include the empty cabin and other (e.g., introduced, additional) items. After the background subtraction is performed on the comparison image using the reference image, the only elements remaining in the comparison image may be the other items (e.g., forgotten items).

Figure 5:
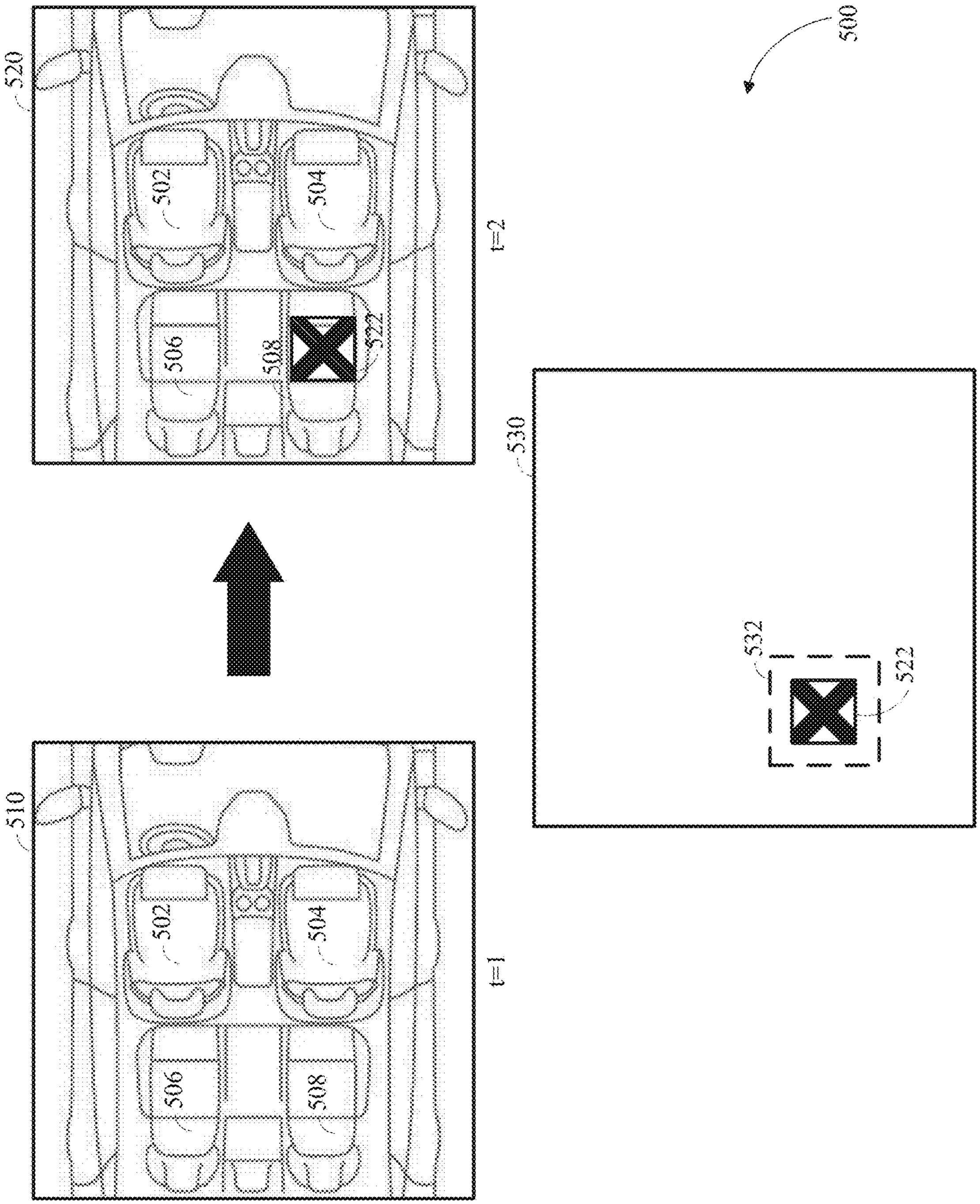
FIG. 5 is an illustration of object detection using depth aided image background removal.

FIG. 5 is an illustration 500 of object detection using depth aided image background removal. The illustration 500 depicts a reference image 510, a comparison image 520, and the difference image 530 (i.e., results of the background subtraction). The reference image 510 includes a driver-side front seat 502, a passenger-side front seat 504, a driver-side rear seat 506, and a passenger-side rear seat 508. The reference image is captured at t=1 (i.e., the beginning of a trip, the start of a time-period). Alternatively, the reference image may be a base image of the cabin of the vehicle, as such t=1 may be a fixed time that does not correspond to the beginning of any particular trip.

The comparison image 520 includes a driver-side front seat 502, a passenger-side front seat 504, a driver-side rear seat 506, a passenger-side rear seat 508, and an additional (e.g., introduced) item 522 (also called a remaining element). The comparison image is captured at t=2 (i.e., the end of a trip, the end of a time-period). Given the reference image 510 and the comparison image 520, all the common elements may be removed from the comparison image 520. As a result, the difference image 530 includes only the additional item 522 as a detected item 532.

Referring again to FIG. 4, at operation 408, the process 400 determines whether there are remaining elements in the second image (i.e., the comparison image). The process 400 determines if there are remaining items by analyzing the results of the background subtraction of the reference image from the comparison image. As shown in the difference image 530 of FIG. 5 there may be one or more detected items, such as the detected item 532. Additionally, there may be no detected items after the background subtraction is performed. If there are no detected items (remaining elements), then the process 400 ends; otherwise the process 400 proceeds to operation 410.

At operation 410, the process 400 determines whether the images (both reference and comparison) were captured using an infrared camera. In other words, does the reference image the comparison image, or both contain infrared data? If the reference image, the comparison image, or both contain infrared data, the process 400 proceeds to operation 412, otherwise the process 400 proceeds to operation 418. In an alternative implementation, the vehicle may include cameras that separately capture image depth data and infrared data. In this example, two sets of data may be captured at operation 404, and the process 400 advances directly from operation 408, in the event the query indicates that there are remaining elements, to operation 412.

At operation 412, the process 400 determines if there is an infrared signature detected. If there is an infrared signature, the process 400 proceeds to operation 414; otherwise, the process 400 proceeds to operation 418.

At operation 414, the process 400 determines if the infrared signature is an unattended occupant of the vehicle. In other words, is the infrared signature a living being (e.g., human, animal) that may be trapped within the vehicle. The infrared data may be used to detect multiple infrared signatures; however, some infrared signatures may be residual infrared signatures as compared to active infrared signatures. A residual infrared signature may indicate that an occupant was sitting in the cabin of the vehicle recently but is not currently within the cabin of the vehicle, whereas an active infrared signature may indicate that the occupant may still be within the cabin of the vehicle. If the process 400 determines that there is an unattended occupant within the cabin of the vehicle, the process proceeds to operation 416; otherwise, the process proceeds to operation 418.

Figure 6:
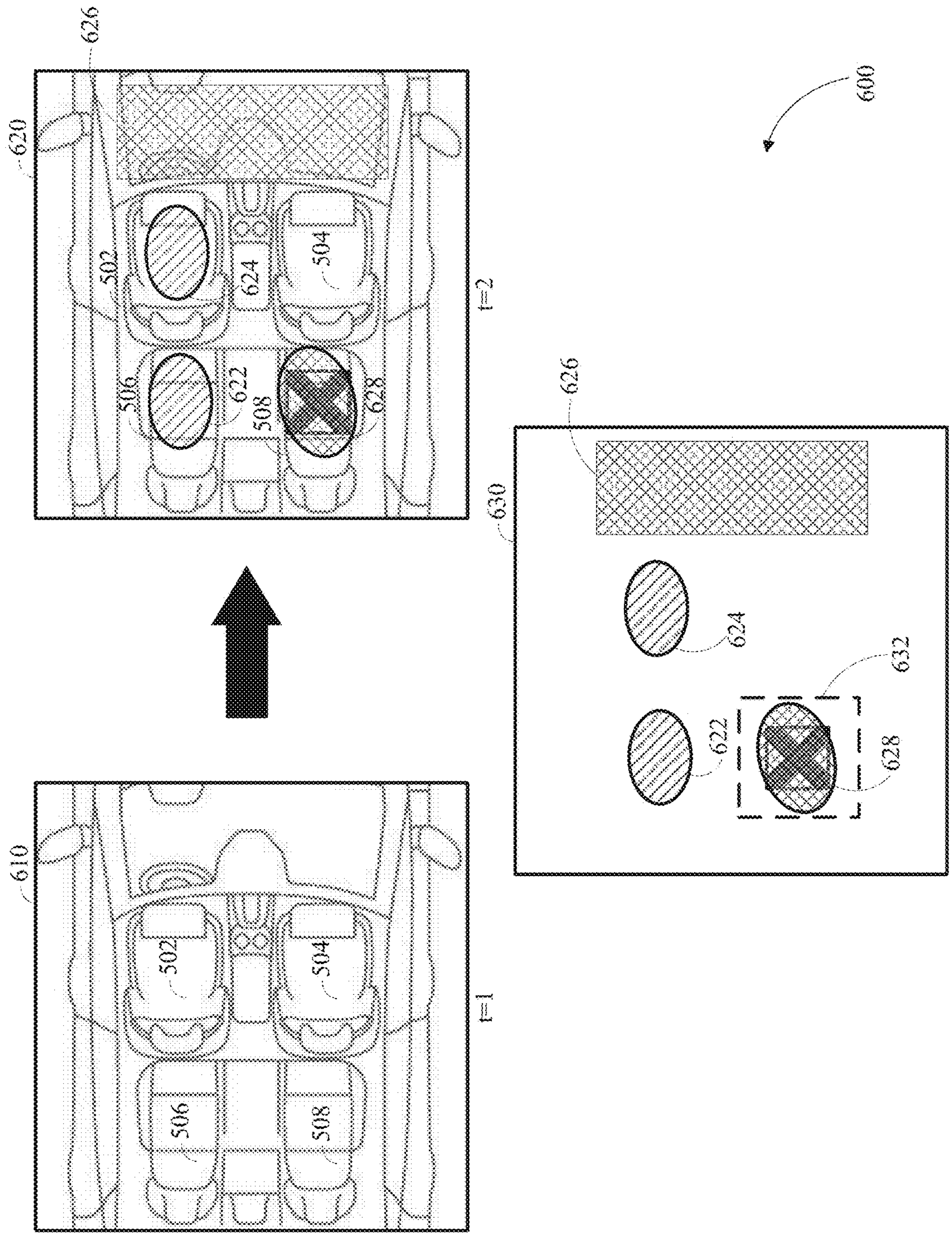
FIG. 6 is an illustration of object detection using infrared aided image background removal.

FIG. 6 is an illustration of object detection using infrared aided image background removal. The illustration 600 depicts a reference image 610, a comparison image 620, and the difference image 630 (i.e., the result of the background subtraction). The reference image 610 includes a driver-side front seat 502, a passenger-side front seat 504, a driver-side rear seat 506, and a passenger-side rear seat 508 as described with regards to FIG. 5.

The comparison image 620 includes a driver-side front seat 502, a passenger-side front seat 504, a driver-side rear seat 506, and a passenger-side rear seat 508, as described with regards to FIG. 5. The comparison image 620 also includes a residual infrared signature 622, a residual infrared signature 624, an active infrared signature 626, and an active infrared signature 628. The comparison image is captured at t=2 (i.e., the end of a trip, the end of a time-period). Given the reference image 610 and the comparison image 620, the common elements may be removed from the comparison image 620. As a result, the subtraction image (e.g., difference image 630) depicts the residual infrared signature 622, the residual infrared signature 624, the active infrared signature 626, the active infrared signature 628, and a detected object 632.

The infrared signatures may be further analyzed to determine whether the infrared signature is residual or active. When an occupant of the cabin of the vehicle sits within the vehicle, a certain amount of heat may transfer from the occupant to the seat of the vehicle. As such, the seat in which the occupant was sitting will remain warm for a period after the occupant leaves the vehicle. Even though the seat may still remain warm and the heat may appear in an infrared image, the infrared signature may not be as prominent as when the occupant is still within the vehicle. Given a threshold infrared signature, the process 400 may determine that the infrared signature is a residual infrared signature, such as residual infrared signature 622 and residual infrared signature 624.

Furthermore, certain areas of the cabin of the vehicle may retain more heat that others due to a number of factors such as the heat from the engine of the vehicle, the proximity to windows, the time of day, and the intensity of the sun. As such, some infrared signatures may be above a threshold infrared signature such as the active infrared signature 626. The infrared signature may be caused by the proximity of the dashboard of the vehicle to the engine, the sun shining in through the windshield, or both. While the infrared signature may appear to be an active infrared signature this may be filtered out based on the location of the infrared signature and known factors that may cause false positives. Moreover, no object is detected within the area encompassing the active infrared signature 626.

Lastly, an active infrared signature may be caused by an occupant sitting with the vehicle. The occupant may be a driver or a passenger. The passenger may be an adult, a child, or an infant; alternatively, the passenger may be a pet. The occupant may be unattended within the cabin of the vehicle. For example, the active infrared signature 628 not only depicts an active infrared signature. That same region of the comparison image 620 also depicts the detected object 632. The detected object 632 may be a blanket, a baby carrier, a pet carrier, etc. In either case, detecting the object alone may not be enough to generate a notification. Additionally, to whom the notification may be sent may not be clear. Adding the detection of the infrared signature to the comparison image may allow the process 400 to determine that there is an unattended occupant still within the cabin of the vehicle.

Referring again to FIG. 4, at operation 416, the process 400 notifies an emergency service of an unattended occupant in the vehicle. For example, given a baby carrier detected within the cabin of the vehicle and an active infrared signature detected at the same position within the cabin of the vehicle the process 400 may determine that an emergency service (i.e., 911, fire department, police department, etc.) may be contacted. The emergency service may be contacted using SMS, MMS, RCS, E-Mail, or any other acceptable method of contacting the emergency service.

At operation 418, the process 400 categorizes the one or more remaining elements of the second image (i.e., comparison image). That is, the process 400 determines what the remaining elements are, such as, a phone, a purse, a backpack, or a laptop bag, to name a few. The remaining elements could be almost any possible handheld or carried item. The categorization of any remaining element can be performed using any conventional image detection and categorization technique. For example, the image data can be compared to image data within a database of known image data. The image data can be provided to a trained machine learning model to categorize the detected objects (remaining elements). The categorization can be made using size, color, or other attributes identified by the image data.

At operation 420, the process 400 selectively notifies an occupant (e.g., a present or past occupant) of the vehicle based on a categorization of at least one of the one or more remaining elements (i.e., forgotten items, detected objects). In other words, depending on the classification or identification of the forgotten items detected, the driver, the passenger, both, or neither may be notified. For example, the process 400 may determine that during a ride-share trip, the passenger in the back seat accidentally forgot their purse. The process 400 may determine, given that the vehicle is being used for ride-sharing and the passenger was seated in the backseat, that the passenger may be notified of their forgotten purse.

In another example, the process 400 may determine that the owner of the vehicle forgot their laptop case in the cabin of the vehicle. As such, when the trip ends and the driver exists the vehicle, the process 400 may notify the driver of the forgotten laptop case. Alternatively, the process may determine not to notify an occupant of the vehicle based on a different classification or identification of the forgotten item. The process 400 may classify or identify the forgotten item as a newspaper or a magazine. As such, when the trip ends and the driver exists the vehicle, the process may determine that a notification will not be sent. In either case, the process 400 may selectively notify an occupant. That is, the process 400 determines to send the notification based on the classification or identification of the forgotten item and the occupant. For example, in the prior example given a classification or identification of the forgotten item as a newspaper or a magazine and a determination that the forgotten item belongs to the driver, the process 400 may not send a notification. However, if the process determines that the forgotten item, with the same classification or identification, belongs to a passenger during a ride-share trip, the process 400 may determine to send a notification to the passenger.

Herein, the terminology "passenger", "driver", or "operator" may be used interchangeably. Also, the terminology "brake" or "decelerate" may be used interchangeably. As used herein, the terminology "processor", "computer", or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special-purpose processor or circuitry that may include specialized hardware for carrying out any of the methods, algorithms, aspects, or combinations thereof, as described herein. In some implementations, portions of the instructions may be distributed across multiple processors on a single device, or on multiple devices, which may communicate directly or across a network, such as a local area network, a wide area network, the Internet, or a combination thereof.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:

obtaining a first image of an interior of a vehicle for a start of a time-period and a second image of the interior of the vehicle for an end of the time-period, wherein the first image and the second image include a depth metric, wherein the first image and the second image include common elements and the second image includes a remaining element not present in the first image;

performing a depth aided background subtraction operation based on the depth metric, wherein the depth aided background subtraction operation results in removing the common elements from the second image and retaining the remaining element;

categorizing the remaining element of the second image;

determining whether to transmit a notification with respect to the remaining element based on the categorizing;

detecting an infrared signature of an element within the second image, wherein the second image is obtained using an infrared camera;

determining that the infrared signature is an unattended occupant; and notifying an emergency service of the unattended occupant in the vehicle.

2. The method of claim 1, wherein the start of the time-period is based on at least one of a turning on of the vehicle, a closing of a door of the vehicle, or a start trip operation of a navigation system of the vehicle.

3. The method of claim 1, wherein the end of the time-period is based on at least one of a turning off of the vehicle, an opening of a door of the vehicle, or an end trip operation of a navigation system of the vehicle.

4. The method of claim 1, wherein the end of the time-period is based on a motion detection sensor.

5. The method of claim 1, wherein the first image is selected from a first stream of images corresponding to the start of the time-period and the second image is selected from a second stream of images corresponding to the end of the time-period.

6. The method of claim 1, wherein performing the depth aided background subtraction operation comprises:

generating a residual image in which the common elements are removed and the remaining element is visible.

7. The method of claim 1, wherein the remaining element corresponds to an object introduced into the vehicle interior after the start of the time-period.

8. The method of claim 1, wherein categorizing the remaining element comprises:

classifying the remaining element based on at least one of a size of the remaining element, a color of the remaining element, or a location of the remaining element within the vehicle interior.

9. The method of claim 1, wherein detecting the infrared signature of the element within the second image comprises:

detecting the infrared signature based on a motion detection sensor detecting motion within the vehicle interior at the end of the time-period.

10. An apparatus, comprising:

a memory; and a processor configured to execute instructions stored in the memory to:

obtain a first image of an interior of a vehicle for a start of a time-period and a second image of the interior of the vehicle for an end of the time-period, wherein the first image and the second image include a depth metric, wherein the first image and the second image include common elements and the second image includes a remaining element not present in the first image;

perform a depth aided background subtraction operation based on the depth metric, wherein the depth aided background subtraction operation results in removing the common elements from the second image and retaining the remaining element;

categorize the remaining element of the second image;

determine whether to transmit a notification with respect to the remaining element based on the categorizing;

detect an infrared signature of an element within the second image, wherein the second image is obtained using an infrared camera;

determine that the infrared signature is an unattended occupant; and notify an emergency service of the unattended occupant in the vehicle.

11. The apparatus of claim 10, wherein the start of the time-period is based on at least one of a turning on of the vehicle, a closing of a door of the vehicle, or a start operation of a navigation system of the vehicle and the end of the time-period is based on at least one of a turning off of the vehicle, an opening of the door of the vehicle, or an end operation of the navigation system of the vehicle.

12. The apparatus of claim 10, wherein the first image is selected from a first stream of images corresponding to the start of the time-period and the second image is selected from a second stream of images corresponding to the end of the time-period.

13. The apparatus of claim 10, wherein to perform the depth aided background subtraction, the processor is configured to execute instructions stored in the memory to:

generate a residual image in which the common elements are removed and the remaining element is visible.

14. The apparatus of claim 10, wherein the remaining element corresponds to an object introduced into the vehicle interior after the start of the time-period.

15. The apparatus of claim 10, wherein to detect the infrared signature of the element within the second image, the processor is configured to execute instructions stored in the memory to:

detect the infrared signature based on a motion detection sensor detecting motion within the vehicle interior at the end of the time-period.

16. A non-transitory computer-readable medium storing instructions operable to cause one or more processors to perform operations, comprising:

obtaining a first image of an interior of a vehicle for a start of a time-period and a second image of the interior of the vehicle for an end of the time-period, wherein the first image and the second image include a depth metric, wherein the first image and the second image include common elements and the second image includes a remaining element not present in the first image;

performing a depth aided background subtraction operation based on the depth metric, wherein the depth aided background subtraction operation results in removing the common elements from the second image and retaining the remaining element;

categorizing the remaining element of the second image;

determining whether to transmit a notification with respect to the remaining element based on the categorizing;

detecting an infrared signature of an element within the second image, wherein the second image is obtained using an infrared camera;

determining that the infrared signature is an unattended occupant; and notifying an emergency service of the unattended occupant in the vehicle.

17. The non-transitory computer-readable medium of claim 16, wherein the first image is selected from a first stream of images corresponding to the start of the time-period and the second image is selected from a second stream of images corresponding to the end of the time-period.

18. The non-transitory computer-readable medium of claim 16, wherein performing the depth aided background subtraction operation comprises:

generating a residual image in which the common elements are removed and the remaining element is visible.

19. The non-transitory computer-readable medium of claim 16, wherein the remaining element corresponds to an object introduced into the vehicle interior after the start of the time-period.

20. The non-transitory computer-readable medium of claim 16, wherein detecting the infrared signature of the element within the second image comprises:

detecting the infrared signature based on a motion detection sensor detecting motion within the vehicle interior at the end of the time-period.

* * * * *